United States Patent [19]

Mansmann et al.

[11] 3,894,878
[45] July 15, 1975

[54] PRODUCTION OF FOAMED POROUS SHAPED STRUCTURES OF LIGNIN SUITED FOR CARBONIZATION

[75] Inventors: Manfred Mansmann; Gerhard Winter, both of Krefeld, Germany

[73] Assignee: Bayer Aktiengesellschaft, Leverkusen, Germany

[22] Filed: Apr. 11, 1972

[21] Appl. No.: 243,054

[30] Foreign Application Priority Data
Apr. 16, 1971  Germany............................ 2118487

[52] U.S. Cl. ....... 106/122; 106/123 R; 106/123 LC; 260/2.5 F; 260/2.5 N
[51] Int. Cl.............................................. C08h 15/02
[58] Field of Search....... 260/2.5 F, 2.5 N; 106/122, 106/123 R, 123 LC

[56] References Cited
UNITED STATES PATENTS

| | | | |
|---|---|---|---|
| 1,936,887 | 11/1933 | Spencer............................ | 106/122 |
| 2,926,722 | 3/1960 | Lauring............................ | 260/2.5 F |
| 2,947,647 | 8/1960 | Hart et al. ....................... | 260/2.5 F |
| 3,001,956 | 9/1961 | Meinel............................. | 260/2.5 N |
| 3,090,761 | 5/1963 | Backlund et al................. | 260/2.5 N |

*Primary Examiner*—Joseph L. Schofer
*Assistant Examiner*—P. R. Michl
*Attorney, Agent, or Firm*—Burgess, Dinklage & Sprung

[57] ABSTRACT

In the production of porous shaped structures suitable for carbonization by foaming an organic material capable of being carbonized, and thereafter consolidating the foamed structure as a preliminary to subsequent carbonization, the improvement which comprises employing as the organic material to be foamed and capable of being carbonized an aqueous solution of lignin. The lignin solution preferably contains about 0.01 to 5% by weight of polyethylene oxide or an acrylic acid-acrylamide copolymer having a degree of polymerization in excess of about 2,000. After foaming to achieve a density of less than about 1 gram per cubic centimeter, the foam is consolidated by heat treatment and/or acidification. The resulting product can be carbonized to form porous carbon foams.

6 Claims, No Drawings

PRODUCTION OF FOAMED POROUS SHAPED STRUCTURES OF LIGNIN SUITED FOR CARBONIZATION

The invention relates to the production of foamed porous shaped structures of lignin suited for carbonization to correspondingly shaped carbon structures.

Moldings of carbon of high pore volume, so-called foamed carbon, have for some time been commercially available. They are used above all in the fields of heat insulation up to very high temperatures, filtration of chemically reactive and corrosive gases and liquids and, finally, catalysis, where they act as a carrier material of high available surface area. They are manufactured by carbonization of rigid synthetic resin foams according to two methods (O. Vohler et al., Angew. Chem. 82 (1970) 406): a foam which on carbonization only gives a low yield of carbon, such as, for example, a polyurethane foam, is impregnated with a synthetic resin which gives a high carbon residue, for example with a phenolic resin, or the foam to be carbonized consists directly of a plastic which gives a sufficient yield of carbon, such as, for example, a phenolic resin foam.

In each case, a relatively expensive organic synthetic material has to be used, which furthermore must not soften or melt on heating.

An organic material which is available in large quantities and is inexpensive comprises lignin. Lignin is present to the extent of 20 – 30% in wood and is left in enormous amounts as an undesired by-product in the manufacture of cellulose. There has been no shortage of attempts to process lignin further into commercially usable products, but the bulk of the lignin which is left from the manufacture of cellulose still has to be burnt or disposed of in some other way. The possibility of using lignin as a particularly cheap starting material for foamed carbon would be very advantageous. Lignin can be rendered spinnable from aqueous solution by adding small amounts of linear high polymers such as, for example, polyethylene oxide, so that lignin solutions can be spun, by the methods of the synthetic fiber industry, into fibers which by a subsequent carbonization can be converted into carbon fibers. The spinning process yields dense, non-porous lignin fibers which, upon heat treatment, yield carbon fibers which are also dense and non-porous. Even if thin layers are poured out and subjected to heat the resultant products are dense gel layers.

It is accordingly an object of the present invention to provide processes for producing carbon foams using inexpensive starting materials which have the requisite physical and chemical properties.

It is accordingly a further object of the invention to provide a process for making carbon foams starting with lignin.

These and other objects and advantages are realized in accordance with the present invention pursuant to which an aqueous solution of lignin is formed into a shaped structure such as a molding or a film having a thickness of about 500 $\mu$ or more, preferably in excess of about 1 mm, and subjected to heat or other conditions to form a foam. The foam is thereafter consolidated, i.e. fixed in physical structure, and is subsequently carbonized.

As employed herein, the term carbonization has reference to the heat treatment of an organic substance at a temperature of at least about 400°C under an inert gas, at normal pressure or reduced pressure. Preferably, the heating is effected at about 1,000°C although it may go up to 2,000°C or more. When the heat treatment is effected at a temperature of about 2,000°C or higher, perhaps up to about 3,000°C, under a protective gas, the treatment is termed graphitization.

In the present invention, the foam need not consist of 100 % carbon, but may in addition to the main proportion of carbon, also contain smaller proportions of nitrogen, oxygen, hydrogen or sulfur or the cations on which the ligninsulfonates ar based, for example sodium, potassium, magnesium, calcium, aluminum, iron or chromium. Furthermore, the term lignin means not only a product which has been purified to remove other concomitant substances, such as, for example, sugars, but also unpurified sulfite waste liquor.

Depending on the method of digestion which is used, lignin may occur either in the form of alkali lignin, thiolignin or ligninsulfonic acid salts (so-called sulphite waste liquor), and all of these forms can be used as starting materials, either as such or in a treated form.

As lignin starting materials it is therefore possible to use all lignin solutions from the sulfite digestion; depending on the process used these so-called sulfite waste liquors essentially consist of sodium, ammonium, magnesium or calcium lignin-sulfonates in addition to varying amounts of sugars (glucose, mannose, xylose and arabinose) as well as acetic acid, furfurol, hydroxymethylfurfurol and aromatic substances. Equally Na, $NH_4$, Mg and Ca ligninsulfonates or ligninsulfonic acid, which have been purified, e.g. freed of carbohydrates by fermentation or treatment with yeast, can be used. Equally, the potassium, aluminum, iron or chromium ligninsulfonates obtained therefrom can be employed.

Particularly suitable starting materials for the manufacture of foamed carbon which is as pure as possible are free ligninsulfonic acid and ammonium ligninsulfonate. Ammonium ligninsulfonate eliminates $NH_3$ at elevated temperature and on carbonization aand/or graphitization yields pure foamed carbon free of metal ions.

For the manufacture of foamed carbon articles which are as free as possible of cations it is possible conveniently to begin by converting any ligninsulfonate solution into the free ligninsulfonic acid by reaction with cation exchangers in the $H^+$ form. Contaminations due to contained sugar do not interfere.

Calcium can be partially or wholly removed from calcium ligninsulfonate solutions as a sparingly soluble calcium salt. Suitable sparingly soluble salts are, for example, calcium sulfate, calcium carbonate or calcium oxalate. If the corresponding acid is used as the precipitant, the free ligninsulfonic acid is obtained. To manufacture foamed carbon articles which are free of metal ions it is however also possible to precipitate the calcium by means of the appropriate ammonium salts, whereby an ammonium ligninsulfonate solution is obtained. The precipitation of sparingly soluble calcium salts has also proved of value for removing calcium from other ligninsulfonate solutions, which frequently contain small amounts of calcium. Thus, for example, ammonium oxalate can be used to precipitate calcium, down to a residual content of 10 ppm, from a 50 % strength ammonium ligninsulfonate solution of ammonium ligninsulfonate of the following composition: 45.9 % C; 2.9 % $NH_3$; 6.6 % S; 0.3 % Ca.

The concentration of the lignin component (calculated as dry substance) in the solution can be varied within wide limits, for example between 20 and 80 % by weight. Concentrations between 30 and 60 % by weight are preferred.

Whereas lignin solutions without the addition of high molecular additives are not suitable for a fiber spinning process it has been found, surprisingly, that lignin solutions in a highly concentrated form already display a sufficient cohesion, required for the manufacture of a foamed article, without these additives. However, foaming can be achieved with relatively dilute lignin solutions say 20 to 45 % by weight by addition of about 0.1 to 5 %, and preferably about 0.1 to 2 %, by weight of the entire solution of polyethylene oxide or an acrylic acid-acrylamide copolymer having a degree of polymerization in excess of about 2,000. As employed herein, the acrylic acid-acrylamide copolymers have a ratio of acrylic acid to acrylamide of about 0 : 1 to 1 : 0. The arylic acid component may be present in acid form or in salt form, e.g. as the sodium, potassium or ammonium salt.

These more dilute lignin solutions are well suited if solid fillers are added. These fillers are preferably added in a finely divided state, and their proportion in the total system can be up to about 80 %. Thus, for example, it is possible to add, in addition to inorganic fillers such as calcium sulate, kaolin, kieselguhr, asbestos and other silicates, carbon black, ground graphite and coke and also products which can only be converted into carbon by the carbonization treatment such as, for example, wood flour or lignin powder, which has been rendered insoluble, for example, by a heat treatment at between 80° and 400°C. To achieve improved mechanical properties, organic and inorganic fibers or carbon fibers, or fibers which are insoluble in the lignin solution and can be converted into carbon, for example cellulose fibers or lignin fibers, can also be employed advantageously. If desired, the foamable liquid systems can also contain small additions of wetting agents and/or foam stabilizers as well as additives which have a consolidating action, such as, for example, alkali silicate solutions, silica sol, hydrolyzed silicic acid esters and others.

The foamable liquid systems obtained in this manner are very easy to manipulate. They can be manufactured with a wide range of viscosities and can be converted, with good results, into porous moldings. Preferred viscosity values lie between about 1 and 1,000 poise.

Possible procedures for the manufacture of the porous moldings from the liquid media described are principally the methods employed in making plastic foams. In the solvent process, the solvent which evaporates on warming acts as the blowing gas. At the same time the lignin solution consolidates as a result of the evaporation of the water and the effect of temperature, so that a porous article is produced. The blowing gas process can also be used. In this, a gas is dissolved under pressure and on releasing the pressure the expansion results in the formation of a foam which can be consolidated, for example by raising the temperature. However, the blowing gas can also originate from the decomposition of a blowing agent added to the mixture, for example ammonium carbonate, ammonium nitrite, ammonium nitrate or organic chemicals which split off $N_2$. According to the foam whipping process, the mixture to be foamed is vigorously whipped and subsequently consolidated, for example by drying. Porous moldings also result on using the salt solution process, in which a compound which is insoluble in the liquid medium which is to be foamed is uniformly dispersed, the mass is consolidated, the lignin constituent is insolubilized and subsequently the added compound is dissolved out, for example with acid.

The consolidation of the foam is in general effected by removing the solvent and/or raising the temperature.

In some cases, the consolidation of the foam can be accelerated by changing the pH. Thus, for example an ammoniacal solution of an ammonium ligninsulfonate which has been mixed with polyethylene oxide foams well, whereas the same solution, in the neutral range, forms a visco-elastic gel. On foaming the ammoniacal solution, the pH value in the foamed article rapidly drops through the evaporation of $NH_3$, so that the article gels.

The foamed articles obtained in this manner, which are light brown to dark brown depending on the starting material, are still water-soluble. They may therefore be subjected to a pre-treatment wherein they are simultaneously dried and become insoluble in water. In the course thereof, the foamed lignin articles discolor to a deep black. The lignin substance is conveniently insolubilized by heating to temperatures between about 80° and 400°C. The requisite final temperature depends somewhat on the nature of the starting material and is lower for pure ligninsulfonic acid (approximately 100°–150°C) than for ligninsulfonates (approximately 200°–250°C) or for sulfite waste liquors (approximately 300°–400°C). Up to approximately 250°C the process is generally carried out in air whereas above this it is carried out, for reasons of safety, under an inert gas, especially under nitrogen. It is however also possible to carry out the pre-treatment entirely under an inert gas. The effectiveness of the pre-treatment is easily tested: a small amount of the foam is boiled up with water; very small proportions of soluble substances can immediately be detected because they intensely discolor the water. The drying and insolubilizing of the foamed lignin articles can be carried out as a separate process step but does not have to be. Rather, it is also possible to include it in the process step of carbonization.

The foamed lignin articles are, after the pre-treatment, already products which can be put to practical use and which are insensitive to numerous solvents. Their low inflammability is surprising. The apparent densities are between about 0.05 and 1, preferably between about 0.1 and 0.5 g/cm$^3$. Because of these properties they can be used as a particularly cheap insulating material.

On raising the temperature to above 400°C, under an inert gas, the foamed lignin articles are converted into foamed carbon articles. One advantage of the process is that the rate of heating can be very great without the quality of the resulting foams suffering as a result. A heating rate of about 100° to 1,000°/hour is conveniently chosen. In the manufacture of foamed carbon, the stage of pre-treatment of the foamed lignin articles is usually included with the carbonization process. If required, the carbonization can be followed by a graphitization treatment.

The foamed carbon articles contain a carbon content which depends on the starting material and on the final temperature of their heat treatment and for the same final temperature this carbon content is higher for foams from ligninsulfonic acid than for foams from ammonium ligninsulfonate, and it is in turn higher for the latter than for also from ligninsulfonates containing metal ions. The foamed articles which have been subjected to a graphitization treatment consist of practically 100% carbon, since at these temperatures the metals alsos largely evaporate. Table 1 summarizes the analytical data, as a function of the final temperature, for foamed carbon from amonium ligninsulfonate initially analyzing 43 % C, 7.6 total S and 4.8 % $NH_3$ by weight:

Table 1

| Final Temperature (°C) | C(%) | H(%) | N(%) | S(%) |
|---|---|---|---|---|
| 1,000 | 82 | 1.3 | 2.5 | 1.2 |
| 1,200 | 92 | 0.5 | <0.5 | 0.9 |
| 1,600 | 97 | — | <0.5 | 0.6 |
| 2,000 | 99 | — | <0.5 | <0.3 |

A foamed carbon article manufactured from calcium ligninsulfonate on the other hand only contains 62 to 68% of carbon at a final carbonization temperature of 1,000°C, whereas a cation-free ligninsulfonic acid manufactured from the same lignin starting material by ion exchange shows 88.5 % of carbon at 1,000°C.

X-ray examination of the foamed carbon articles shows only a completely amorphous diagram after the carbonization treatment. After the "graphitization" the X-ray diagram does not show the interference pattern of graphite, but only of greatly disordered turbostratic carbon.

The foamed carbon articles thus manufactured can be sawed, nailed and glued. Depending on the foaming conditions used and on the degree of filling with solid additives, porosity values of up to 95% and apparent density values of between about 0.05 and 1, preferably between 0.1 and 0.5, $g/cm^3$ are obtained.

The invention is explained in more detail below, with the aid of the following illustrative examples:

EXAMPLE 1

A 60% strength aqueous solution of ammonium ligninsulfonate (of 43% C; 4.8% $NH_3$; 7.6% total S; 0.6% Ca) was poured into a glass mold to give a 5 mm thick layer and placed in a drying cabinet heated to 120°C. Thereupon, the lignin foamed up to five times its volume. The foam was heated to 210°C over the course of 2 hours and left for 5 hours at this temperature. The foamed lignin article had an apparent density of 0.08 $g/cm^3$ and was resistant to aqueous acids and ammonia.

A part of the foamed lignin article was heated, under nitrogen, to 400°C at a heating rate of 60°/hour and to 1,000°C at a heating rate of 600°/hour. The residue amounted to 37%, relative to lignin employed. The apparent density of the foamed carbon was 0.15 $g/cm^3$. The article showed good strength. Heating to 2,600°C under argon did not produce any externally visible change in the article; X-ray examination showed a diagram of turbostratic carbon. The residue after graphitization amounted to 35%, relative to lignin employed.

EXAMPLE 2

300 g of aqueous 50% strength ammonium ligninsulfonate solution, as in Example 1, were mixed with 100 g of a 2% strength aqueous polyethylene oxide solution of degree of polymerization 100,000, and 45 g of water. The solution was homogenized while passing in ammonia gas until a pH value of 10 was reached. Its concentration was 33.7% of ammonium ligninsulfonate and 0.45% of polyethylene oxide.

30 g of 5 cm long lignin-carbon fibers were uniformly distributed in 200 g of this solution. The dispersion was introduced into a steel vessel which was closed on all sides apart from venting slits and placed in a drying cabinet, heated to 120°C, where the composition consolidated to give a porous article of apparent density 0.28. The molding was subsequently heated to 1,000°C under nitrogen (heating rate up to 400°C : 100°/hour; up to 600°C : 200°/hour; up to 1,000°C : 500°/hour). A highly pressure-resistant, porous carbon article of apparent density 0.16 $g/cm^3$ resulted.

EXAMPLE 3

55% strength calcium ligninsulfonate solution (relative to dry material: 15% residue on ignition; 7% CaO; 1.5% MgO; 6% total S; 8% of reducing substance, calculated as glucose) was diluted to 43% solids content with water. Using a strongly acid ion exchanger in the $H^+$ form, the cations were removed from the solution and the free acid obtained. After the ion exchange, the calcium content was merely 0.01%. A suspension of 2.7 g of acrylic acid-acrylamide copolymer (degree of polymerization 140,000, acrylic acid content 40%) in 15 g of methanol was added to 200 g of this solution and stirred until it had completely dissolved. 50 g of ground coke were dispersed in this solution. The suspension was introduced into a sheet metal trough and consolidated at 150°C in a drying cabinet to give a porous molding. The subsequent heating to 1,000° under nitrogen was carried out at a heating rate of 200°/hour up to 400°C, and above this at a heating rate of 800°/hour. The resulting porous carbon article showed a density of 0.2 $g/cm^3$.

EXAMPLE 4

Alkali-lignin (of the following analysis: 4.0% Na; 10% residue on ignition; 12.7% methoxy groups; 1.4% S; pH 10; density 1.4 $g/cm^3$) was dissolved in 15% strength aqueous ammonia, at 50°C, to give a 50% strength solution. The solution was immediately thereafter foamed, as a 1 cm thick layer, in a drying cabinet heated to 120°C, and simultaneously consolidated. The subsequent heating takes place as in Example 3. This resulted in porous carbon granules of apparent density 0.09 $g/cm^3$. The granules were about 8 to 15 mm in size.

In Examples 1 and 2, ammonium ligninsulfonate SAP/N was used; in Example 3, calcium ligninsulfonate Collex-Extract CA/X of Messrs. Zellstoff Waldhof was used, and in Example 4, alkali-lignin Indulin B of Messrs. Vestvaco, North Charleston, USA, was used. Analogous results were obtained with similar commercially available products.

It will be appreciated that the instant specification and examples are set forth by way of illustration and not limitation, and that various modifications and changes may be made without departing from the spirit and scope of the present invention.

What is claimed is:

1. In the production of porous shaped structures suitable for carbonization by foaming an organic material capable of being carbonized, and thereafter consolidating the foamed structure as a preliminary to possible carbonization, the improvement which comprises employing as the organic material to be foamed and capable of being carbonized an aqueous solution of lignin in a concentration of about 20 to 80% by weight, thereafter effecting consolidation of the foam by at least one of acidification and heating, and heating to a high temperature short of carbonization to effect insolubilization of the consolidated foam.

2. Process accoring to claim 1, wherein the consolidation of the lignin foam is effected by lowering the pH value from an initial alkaline value to the neutral or acid range.

3. Process according to claim 1, wherien the lignin comprises ligninsulfonic acid or a ligninsulfonate salt.

4. Process according to claim 1, wherein the lignin solution to be foamed contains a powder or fiber filler.

5. Process according to claim 1, wherein the lignin comprises sulfite waste liquor and the final temperature of insolubilization is about 300° to 400°C.

6. Process according to claim 1, wherein the aqueous lignin solution has a lignin concentration of about 20 to 45% by weight and a thickening agent is added thereto to permit foaming.

* * * * *